Figure 1:
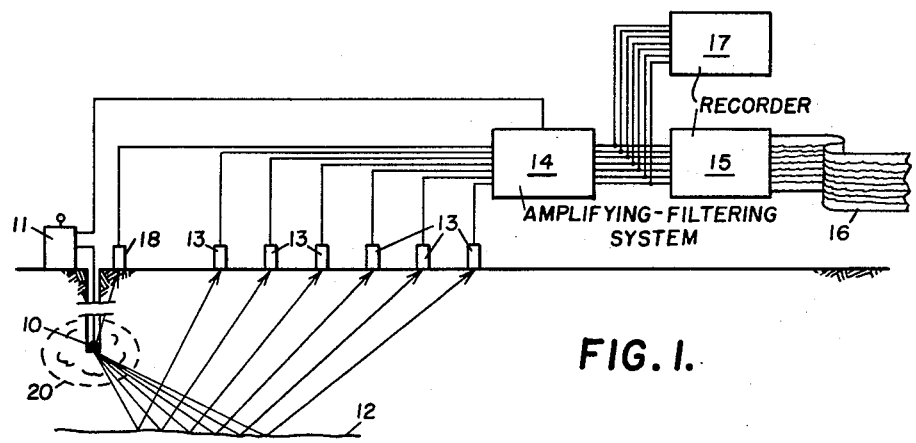

Dec. 22, 1964   P. L. LAWRENCE   3,162,756
SEISMIC FREQUENCY BAND RESTORATION
Filed Jan. 19, 1959   3 Sheets-Sheet 1

PHILIP L. LAWRENCE
INVENTOR.

BY *signature*

ATTORNEY.

Dec. 22, 1964  P. L. LAWRENCE  3,162,756
SEISMIC FREQUENCY BAND RESTORATION

Filed Jan. 19, 1959  3 Sheets-Sheet 2

PHILIP L. LAWRENCE
INVENTOR.

BY *D. Earl Richards*

ATTORNEY.

PHILIP L. LAWRENCE
INVENTOR.

ATTORNEY

United States Patent Office
3,162,756
Patented Dec. 22, 1964

3,162,756
SEISMIC FREQUENCY BAND RESTORATION
Philip L. Lawrence, Dallas, Tex., assignor, by mesne assignments, to Socony Mobil Oil Company, Inc., New York, N.Y., a corporation of New York
Filed Jan. 19, 1959, Ser. No. 787,645
3 Claims. (Cl. 235—183)

This invention relates to seismic exploration and more particularly to the determination of velocity layering of the earth with respect to seismic waves within a predetermined band of seismic frequencies.

In seismic exploration, waves are generated by impulsive energy as upon detonation of an explosive in or above the earth or the impact of a weight on the earth's surface. The seismic signal which may begin its travel as a relatively simple impulse is modified or filtered, altered both in phase and amplitude, as it travels to and is reflected from subsurface reflecting beds. Further alteration occurs in the process of detecting the seismic signals as they arrive back at the earth's surface and further in the process of treating corresponding electrical signals by electrical and electromechanical systems employed to record or indicate the time relationships between the signals. Even though distorted, reflected energy may be identified on the seismogram by time coherence in high amplitude components of the signals.

If the entire system through which the seismic pulse travels were free from distortion, there would be produced, by reason of the reflection process in the earth, a time sequence of pulses arriving back at the earth's surface which would represent both in amplitude and time (or phase) an acoustic reflection profile of the earth formations.

In accordance with the present invention, there has been provided a system for substantially reducing or eliminating within a predetermined band of seismic frequencies the distortion due to instrumentation and due to the earth as well and to provide a representation of the acoustic layering of the earth by proper untilization of signals generated and detected at the earth's surface.

In one embodiment of the system for carrying out the present invention, there is provided a means for generating a first signal representative of earth movement at a detecting station in response to the initiation of a seismic pulse at a sending station having predetermined orientation with respect to the detecting station. Means are then provided for generating an integral and a derivative of the first signal. A summing means is then provided for combining the first signal with the integral and derivative to provide an output signal substantially representative of acoustic velocity layering of the earth.

In accordance with a further embodiment of the invention, a suite of integrals and derivatives is generated where the integrals and differentials are of successively higher orders and of predetermined relative amplitude levels.

In another aspect of the invention, the nature of the "seismic filter," i.e., all of the elements through which the seismic signals have passed, is determined from the resultant signal itself and a "notch" filter provided which has a characteristic which is the reciprocal or inverse of such characteristic of the seismic filter. The signal is then passed through said notch filter to restore, within a selected frequency band, the character the signal would have attained in a system having minimum distortion within said frequency band.

Figure 2:
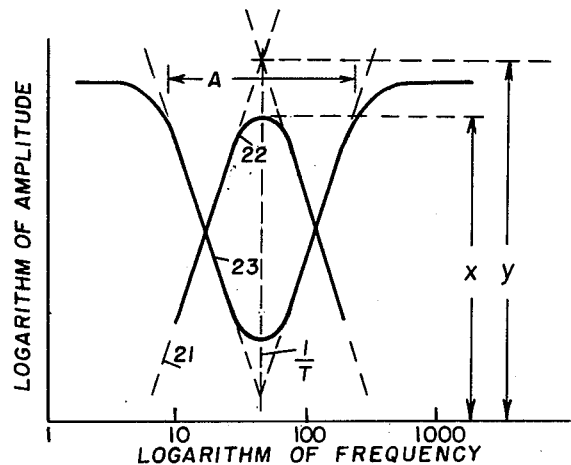
Figure 3:
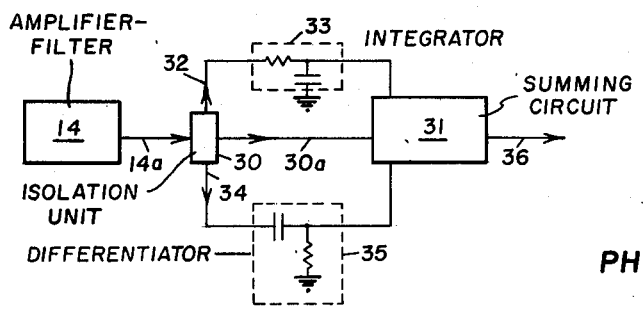
Figure 4:
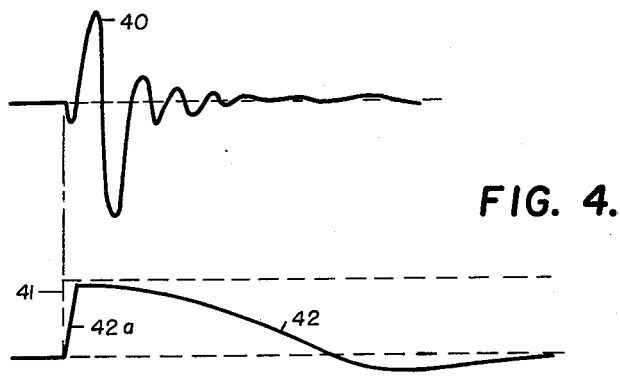
Figure 5:
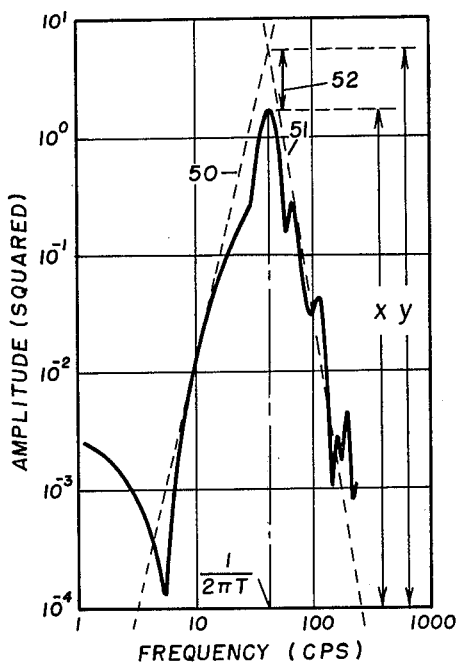
Figure 6:
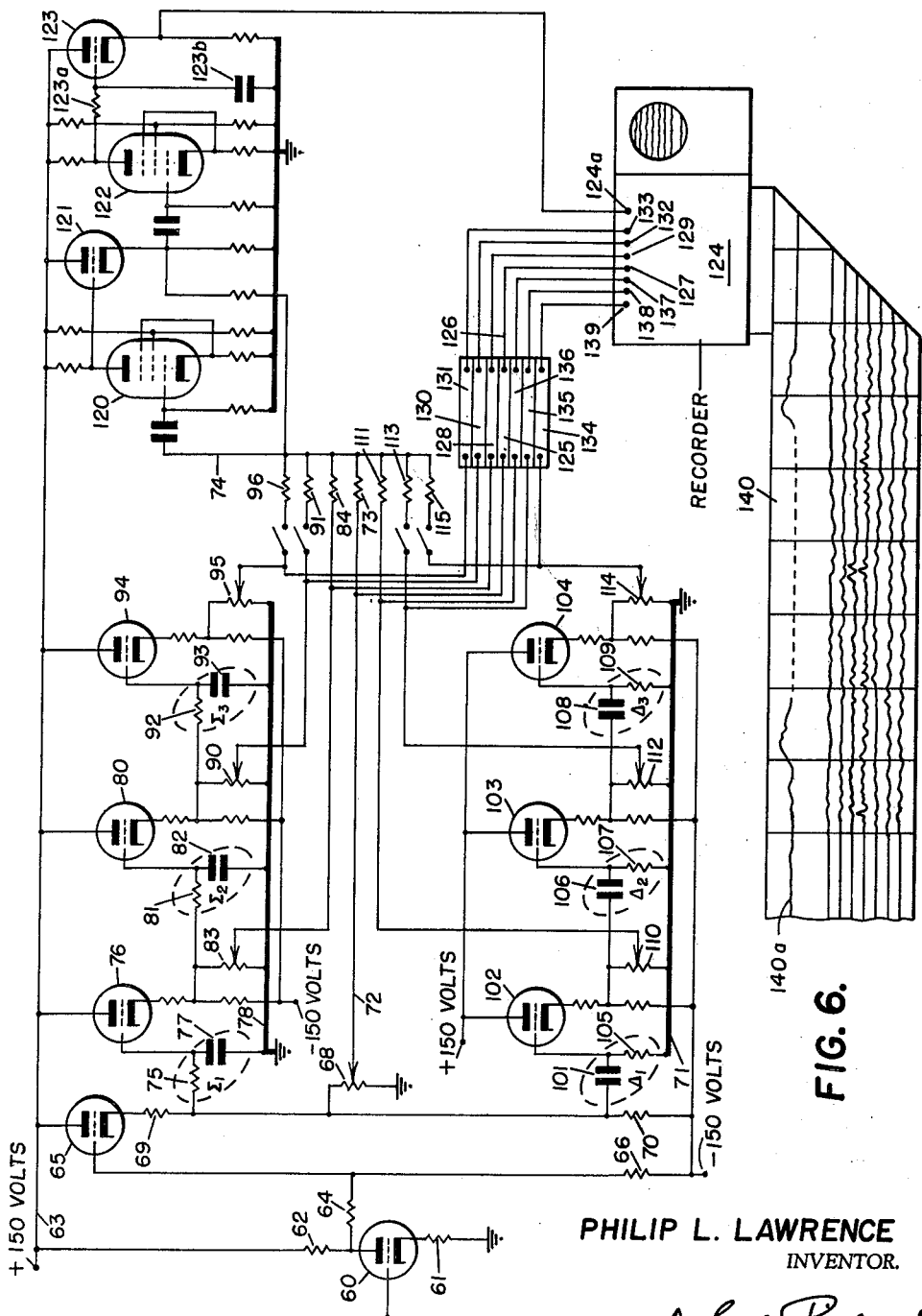

For a more complete understanding of the present invention and for further objects and advantages thereof, reference may now be had to the following description taken in conjunction with the accompanying drawings in which:

FIG. 1 is a diagrammatic representation of a seismic exploring system;
FIG. 2 is a plot of amplitude-frequency filter characteristics;
FIG. 3 is a simplified circuit illustrating the invention;
FIG. 4 illustrates representative waveforms involved in the present invention;
FIG. 5 is a plot of frequency analysis of a received pulse; and
FIG. 6 is a detailed circuit diagram of a notch-filter system employed in accordance with the present invention.

The seismic signal as recorded on a field seismogram or at the output of unit 14, FIG 1, can be expressed as:

$$s(t) = r(t) * b(t)$$

where $s(t)$ is the signal;
$r(t)$ is the reflection function;
$b(t)$ is the impulse response of the seismic filter through which a shot impulse is considered to have passed to obtain the basic reflection waveform; and
$*$ signifies a convolution operation relating the output "$s$" to the input "$r$" of the filter as described by Gardner and Barnes in "Transients in Linear Systems," Wiley (1942), pages 228–236.

In accordance with the present invention it is an object to identify the character of the impulse response of the seismic filter $b(t)$ and then apply the signal $s(t)$ to a filter which will compensate for distortion introduced into the signal by the seismic filter so that the resultant signal may be said to be the reflection function $r(t)$ or its integral ln $v(t)$.

Referring now to FIG. 1, there is illustrated an exploring system including an explosive charge 10 detonated by actuation of a blaster 11 to create seismic waves which travel downwardly to a reflecting interface 12. The seismic waves reflected back to the surface are detected by geophones 13 and applied by way of suitable cables to an amplifying-filtering system 14 whose output in turn is applied to a recorder 15. There is thus produced a seismic record 16 which in conventional form comprises a length of photographic paper with undulating lines extending along the length and transverse timing lines forming a time scale, the zero of which is correlated with the instant of detonation of the charge 10. The lines or traces on the record vary in amplitude in accordance with the signals from geophones 13. As well understood, coincidence in time of high amplitude components of the seismic signals on several traces is relied upon to indicate lithology of the formations.

In theory, the impulse generated by the charge 10 may be considered to be either a step function or a unit pulse, either of which initially is of relatively simple form. However, between the generation of the seismic wave and the recording thereof as on chart 16 considerable changes in the signal take place, some of which occur at points that may be identified as follows:

First, within a zone indicated by the dotted outline 20, where the response of the earth to the high applied stresses is non-linear, considerable distortion of the signal takes place.

Second, the mechanical coupling between the geophone 13 and the earth's surface may be frequency-selective.

Third, the electromechanical system of the geophone itself may be frequency-selective so that further distortion is introduced.

Fourth, even more intensive filtering may be introduced in the amplifier system 14 in attempts to eliminate unwanted noise energy.

Fifth, distortion may be introduced by the recorder 15.

For the purpose of the present description, the foregoing elements will be considered as a single unit and will be referred to as a "seismic filter."

In the absence of any distortion, the reflection process at each of successively deeper interfaces such as the interface 12 would cause the appearance at detectors 13 of a series of relatively simple time-spaced events. However, partly because of the distortion and partly because of the presence of unwanted noise energy, there generally is recorded on chart 16 a rather complex series of interwoven, overlapping time pulses.

In accordance with the present invention, it has been found that the response of the seismic filter may be modified as to eliminate or reduce to a substantial degree the distortion introduced at any or all of the five points above noted so that a record may be produced which is relatively free of distortion. In the limiting case, such a record would be a reflection profile or, if desired, a velocity profile of the earth probed by the pulses from source 10.

The system illustrated in FIG. 1 is presented as representative of seismic recording systems. Included in the system is a second recorder 17 which stores the signals appearing at the output of the amplifying system 14 in reproducible form. In one mode of carrying out the present invention, signals stored by a recorder 17 are treated to eliminate, within a selected frequency band, the distortion introduced by the seismic filter to compensate for or eliminate the effects above discussed.

In order to carry out such an operation, it is desirable to characterize the sum of such effects in terms of the amplitude-frequency response of the seismic filter having characteristics the equivalent of the sum of all the elements of the seismic signal path and the circuits for the resultant electrical signals. The operations are based upon the assumptions: (1) that the signal from the explosive source is a simple impulse, and (2) that the system is a linear one with minimum phase characteristics.

More particularly, the transfer function for a simple approximation of a narrow bandpass filter may be mathematically stated as follows:

$$kG(p) = \frac{kp^n}{(T^2p^2 + 2\eta Tp + 1)^n} \quad (2)$$

where $G(p)$ is the transfer function of the filter;

$p = \frac{d}{dt}$, the time derivative operator;

T is a time constant where $$\frac{1}{T} = j2\pi f_T$$

a "corner" frequency hereinafter defined;

$\eta$ is a relative damping factor; and $n$ is an integer determined by the asymptotic slopes of the passband.

If the foregoing approximation of a bandpass filter is considered with respect to low frequencies, the filter appears to be the same as an $n$th order differentiator which rises to a peak at the mid-frequency of the filter passband. More particularly referring to FIG. 2, it would appear to have the characteristic of the dotted line 21 of FIG. 2 where the mid-frequency is $$\frac{1}{T}$$

With respect to high frequencies, the filter appears to be of the form of an $n$th order integrator.

The band width of the filter is a result of the damping term "$\eta$" in the denominator of Equation 2. This function can be adjusted to approximate filter characteristics varying over wide limits depending upon the damping factor and the number of differentiators and integrators which would be required to approximate a given filter. One form of characteristic is illustrated by the solid line 22 of FIG. 2 which represents a bandpass filter in the range of from about 30 to 60 cycles per second with rejection rates of 6 db/octave.

The reciprocal of the transfer function of a filter such as described by Equation 2 may be expressed in the following manner:

$$\frac{1}{kG(p)} = \frac{(T^2p^2 + 2\eta(Tp + 1)^n}{kp^n} \quad (3)$$

If such an operator as described by Equation 3 could be realized physically, it would provide a means for eliminating the distortion introduced by the filter represented by line 22 of FIG. 2. However, an operator such as expressed in Equation 3 is basically unstable and physically unrealizable. However, it may be approximated with useful results as hereinafter shown. More particularly if $n=1$, then Equation 3 may be written in the following form:

$$\frac{1}{kG(p)} = \frac{(T^2p^2 + 2\eta Tp + 1)}{kp} \quad (4)$$

If the term "$p$" of Equation 4 is interpreted as the derivative operator $$\frac{d}{dt}$$

the equation then says that a derivative of the input signal plus $2\eta$ times the input signal plus an integral of the input signal would provide a sum representative of the output of a filter represented by the notch function 23 of FIG. 2 where unity gain in the integration and differentiation occurs at the circular frequency $$f = \frac{1}{2\pi T}$$

The foregoing represents compensation of a bandpass filter in which the low frequency slope and high frequency slope of the passband are 6 db/octave as illustrated by curve 22.

Stated another way, and applying the foregoing to FIG. 1, if the signal appearing at the output of amplifier 14, FIG. 1, is determined to have characteristics the same as a step function would have after passing through a simple bandpass filter which has equal slopes, each of 6 db/octave, then a notch filter for compensating for distortion resulting from such filter would have characteristics represented by curve 23 and would be of the construction basically indicated in FIG. 3.

More particularly, in FIG. 3 there is illustrated a conductor 14a leading from the amplifying system 14. The signal then passes to an isolation unit 30 and by way of conductor 30a to a summing unit 31. The signal is also transmitted by way of conductor 32 to an integrating network 33 whose output is applied to the summing circuit 31. The signal is also applied by way of conductor 34 to a differentiating network 35 whose output is applied to the summing network 31. Thus on the output channel 36 there appears a signal representative of the sum of (1) the filtered seismic signal, (2) the first integral of such signal and (3) the first derivative of such signal. Two of the three signals to be thus combined would be modified or weighted in amplitude, as will hereinafter be discussed, and then combined in unit 31. The signal appearing on channel 36 may thus be made to be representative of a signal passing through a system of flat frequency response within the limits of the band A, FIG. 2. The limits correspond with the corner frequencies of the integrators and differentiators (i.e., the intersection of the asymptotes of the integrator or differentiator transfer function). Thus by assigning the integrator and differentiator proper time constants, the band width is determined and, within the band determined by the integrator and differentiator time constants, a "flat response" is obtained.

The foregoing discussion has been confined to the relatively simple case in which the amplitude-frequency characteristic of the seismic filter has upper and lower slopes of 6 db/octave whereupon a flat response may be obtained within a given band with a single integrator and a single differentiator. In the more general case it will be found that the upper and lower slopes of the filter response will not be the same and may be considerably steeper than that represented by 6 db/octave, thus requiring more than one integrator and/or differentiator. In general, it may be said that a suite of weighted integrals and differentials will be produced and added to the signal itself for producing the desired output function.

There will now be presented methods by which the seismic filter may be characterized and a notch or compensating filter designed to reduce or eliminate distortion produced by the seismic filter.

It is desirable accurately to evaluate $n$ and $\eta$ of Equation 4 to provide an accurate inverse operator. This may be done in one of the three following ways, the first being the most exact.

(1) If a continuous velocity log obtained in the area from which the seismic signal was obtained is available, this log may then be reproduced as a signal proportional to the logarithm of velocity which varies as a function of time with the time base corresponding with the time scale of the seismogram. This signal may then be passed through a filter to produce a synthetic seismic signal. The filter may be adjusted on repeated filtering cycles until the synthetic seismic signal has the same appearance as the seismogram itself. From the amplitude-frequency response of the filter finally employed, the number and weights of integrals and derivatives to be produced by the notch filter in accordance with the present invention may be determined. More particularly, the factor $n$ is obtained by measuring the slope of the asymptotes of the frequency response where $$n = \frac{m}{6}, \text{ and}$$

$$m = \text{slope in db/octave}$$

The factor $\eta$ is obtained from values represented by $x$ and $y$ of FIG. 2 where $x$, $y$, $n$ and $\eta$ are related as follows:

$$y - x = n \log 2\eta$$

(2) An uphole signal such as detected at uphole geophone 18, FIG. 1, positioned relatively close to the shot point will undergo, to large degree, the same distortion as signals traveling downward through the earth and reflected at the subsurface interfaces. This signal may then be used in either of two modes to determine the nature of the seismic filter and thus determine a correction system.

(a) A first mode is to determine the power spectrum of the uphole signal or, in other words, to obtain the Fourier transform of the auto-correlation function of the uphole signal. The resultant is the power spectrum of the seismic filter. As well understood by those skilled in the art, the power spectrum is the same as the amplitude plot of FIG. 2 but with the amplitude values squared. The significant point is that such spectrum is obtained from the uphole signal and once obtained may be employed as above-described to obtain the number and weights of the integrals and derivatives.

(b) An empirical technique may be followed in order to devise the proper filter. This would involve observation of the characteristic of the uphole signal itself. The reciprocal of the period of a principal oscillation of the uphole signal corresponds with the center frequency $$\frac{1}{T}$$

FIG. 2. The envelope of the uphole signal determines the asymptote (i.e., the number $n$) and the magnitude of the damping function $\eta$ of the seismic filter. The uphole signal then may be reproduced periodically and passed through a filter such as illustrated in FIG. 3. The latter filter may then be adjusted as to the relative amplitudes of the outputs from the integrators 33 and differentiators 35 prior to mixing or summing with the signal appearing on conductor 30a until substantial identity is achieved between the output signal on conductor 36 and a step function.

This operation is illustrated in FIG. 4. If the uphole signal has the waveform illustrated by curve 40, the filter would be adjusted so that the output on conductor 36 would approach the step function waveform 41. In practice, waveform 42 may approach the step function 41 and differs therefrom in that extremely low frequency components are missing. For this reason, there appears a low frequency oscillation. Also the extremely high frequency components are missing and for this reason there appears a slight slope in the initial segment 42a. If a filter such as the filter of FIG. 3 could be realized having a band width extending from zero frequency to an infinite frequency, then waveform 42 could be made identical with the step function 41. However, such a filter would be most difficult if not impossible to realize. Nevertheless, realizable filters are most useful since frequencies not compensated as indicated by the slope of the portion 42a are well above the seismic range of interest and frequencies not compensated as indicated by the low frequency oscillation are well below the seismic range of interest. Thus, correction with a filter which restores uphole signal 40 to the form represented generally by waveform 42 can produce a useful output when the seismic signal obtained in the same location as the uphole signal 40 is passed therethrough.

This second mode of treatment assumes, as will be readily recognized, that all attenuation occurs near the earth's surface, and that the uphole signal consists solely in the direct upwardly traveling wave as from shot 10, FIG. 1. To the extent that these assumptions are unwarranted, this mode of operation will lead to results not rigorously correct but nevertheless highly useful since the assumptions are sound, within a first order of magnitude.

(3) A third mode of treatment would be similar to that described in copending application Serial No. 668,569, now Patent Number 3,076,177, filed by applicant and Foster, a coworker, on June 27, 1957, entitled Elimination of Instrumentation Distortion. In accordance with the latter disclosure and based upon an empirical procedure, a waveform in the signal from the geophones is identified as having been reflected from a subsurface interface of known character. This waveform may then be passed through the correcting filter of the present invention comprising integrators and differentiators while adjustments are made therein until the waveform has a character at the output of the notch filter related directly to the nature of the acoustic velocity contrast at such interface. By way of illustration, if the subsurface bed is thick, uniform and of higher velocity than the two adjacent beds, then the output from the filter should have a configuration at a corresponding time representative of a square pulse. With the filter thus adjusted, the entire seismic signal may then be passed through the filter to produce an output signal which represents substantial elimination of the distortion due to the seismic filter.

There will now be described the compensation for seismic filters having asymptotic slopes unequal and greater than 6 db. Referring to FIG. 5, there has been plotted the power spectrum of an uphole signal corresponding with the uphole signal 40 of FIG. 4. It will readily be seen that the low frequency asymptote 50 has a slope of about 18 db/octave, whereas the high frequency asymptote 51 has a slope of 24 db/octave. Thus the problem of providing a filter to eliminate distortion within the selected band is more complex than presented by the relatively simple graph of FIG. 2 where there are equal rejection rates for both asymptotes. In considering different rejection rates, the transfer function of a filter having a high frequency slope greater than the low frequency slope by 6 db/octave may be expressed as follows:

$$\frac{1}{kG(p)} = \frac{(T^2p^2 + 2\eta Tp + 1)^n (Tp+1)}{kp^n} \quad (5)$$

Where the high frequency slope of the asymptotes is greater by 12 db/octave, the corresponding filter characteristic may be expressed as follows:

$$\frac{1}{kG(p)} = \frac{(T^2p^2 + 2\eta Tp + 1)^{n+1}}{kp^n} \quad (6)$$

Experience indicates that spectra of most seismic signals will fall in one of these three forms. However, it is apparent that other extensions can be made (e.g., greater differences, or greater low and less high frequency slope).

Tables I, II and III set forth the notch frequency weighting coefficients for normalized notch operators set forth in Equations 3, 5 and 6, respectively, having various low and high frequency asymptotes.

From the Tables I–III it will be seen that as the asymptotes of the seismic filter increase in slope, additional derivatives and integrals will be required. For example, if the rejection rates, line 1, Table I, are 6 db/octave, only one differentiator and one integrator are necessary.

If on the other hand the rejection rates are 24 db/octave, line 4, Table I, four integrators and four differentiators would be required.

In order to determine the various weights for the differentiators and integrators from a power spectrum such as shown in FIG. 5, the constants set forth in Tables I–III, the one applicable, would be determined from the slopes of the asymptotes 50 and 51 and the difference between the height of the intercept of the asymptotes and the peak of the power spectrum. More particularly, Tables I–III indicate that for an input of sine wave form and of circular frequency $$\frac{1}{2\pi T}$$

the weights (amplitudes) are determined by $\eta$, the relative damping, and the number of derivatives and integrals are determined by $n$.

TABLE I

*Notch Frequency Coefficients for Normalized Notch Operators Where Rejection Rates of Both Asymptotes Are Equal*

| db/oct. rej. rate | $p^0$ | $p^1, p^{-1}$ | $p^2, p^{-2}$ | $p^3, p^{-3}$ | $p^4, p^{-4}$ |
|---|---|---|---|---|---|
| 6  | $2\eta$ | 1 | | | |
| 12 | $2(2\eta^2+1)$ | $4\eta$ | 1 | | |
| 18 | $4\eta(2\eta^2+3)$ | $3(4\eta^2+1)$ | $6\eta$ | 1 | |
| 24 | $2(8\eta^4+24\eta^2+3)$ | $8\eta(4\eta^2+3)$ | $4(6\eta^2+1)$ | $8\eta$ | 1 |

TABLE II

*Notch Frequency Coefficients for Normalized Notch Operators Where Rejection Rate of the High Frequency Asymptote Is 6 db Higher Than That of the Low Frequency Asymptote*

| db/oct. rej. rate | | $p^0, p^1$ | $p^{-1}, p^2$ | $p^{-2}, p^3$ | $p^{-3}, p^4$ | $p^{-4}, p^5$ |
|---|---|---|---|---|---|---|
| lo | hi | | | | | |
| 6  | 12 | $(2\eta+1)$ | 1 | | | |
| 12 | 18 | $2(2\eta^2+2\eta+1)$ | $(4\eta+1)$ | 1 | | |
| 18 | 24 | $4\eta(2\eta^2+3\eta+3)$ | $3(4\eta^2+2\eta+1)$ | $(6\eta+1)$ | 1 | |
| 24 | 30 | $2(8\eta^4+16\eta^3+24\eta^2+12\eta+3)$ | $4(8\eta^3+6\eta^2+6\eta+1)$ | $4(6\eta^2+2\eta+1)$ | $(8\eta+1)$ | 1 |

TABLE III

*Notch Frequency Coefficients for Normalized Notch Operators Where Rejection Rate of the High Frequency Asymptote Is 12 db Higher Than That of the Low Frequency Asymptote*

| db/oct. rej. rate | | $p^1$ | $p^2, p^0$ | $p^3, p^{-1}$ | $p^4, p^{-2}$ | $p^5, p^{-3}$ | $p^6, p^{-4}$ |
|---|---|---|---|---|---|---|---|
| lo | hi | | | | | | |
| 6  | 18 | $(4\eta+2)$ | $4\eta$ | 1 | | | |
| 12 | 24 | $4\eta(2\eta^2+3)$ | $3(4\eta+1)$ | $6\eta$ | 1 | | |
| 18 | 30 | $2(8\eta^4+24\eta^2+6)$ | $8\eta(4\eta^2+3)$ | $4(6\eta^2+1)$ | $8\eta$ | 1 | |
| 24 | 36 | $4\eta(8\eta^4+40\eta^2+15)$ | $8(10\eta^4+5\eta^2+2)$ | $16(5\eta^2+1)$ | $2(20\eta^2+1)$ | $10\eta$ | 1 | where $p^0$ = the seismic signal;

$p^{-1}, p^{-2} \ldots$ = the first and second integrals of the seismic signal; and $p^1, p^2 \ldots$ = the first and second derivatives of the seismic signal; etc.

From line 1 of Table I where rejection rates of a given filter are both 6 db/octave, column 2 would indicate that the function $p^0$ in the output of the correcting filter will be given an amplitude equal to $2\eta$ where $$\eta = \frac{e}{2}^{-\left(\frac{y-x}{n}\right)} \quad (7)$$

From the third column of Table I, it will be seen that the first integral ($p^{-1}$) and the first derivative ($p^1$) will be summed with the function $p^0$ with amplitudes of one relative to $p^0$. If the rejection rates are 12 db/octave, then $p^0$, $p^1$, $p^{-1}$, $p^2$ and $p^{-2}$ would have the weights indicated by line 2 of Table I. Similarly, the values set forth in line 3 would apply where rejection rates of 18 db/octave are encountered. Line 4 would apply where rejection rates of 24 db/octave are encountered. The weights in Tables II and III apply where the rejection rates are not equal. More particularly, Table II applies where the low frequency rejection rate is 6 db/octave lower than the high frequency rejection rate. Table III applies where the low frequency rejection rate is 12 db/octave lower than the high frequency rejection rate.

From the foregoing it will be seen that a suite of derivative functions of successively higher orders and properly adjusted in amplitude along with a suite of integral functions of successively higher orders and properly adjusted amplitudes may be employed to be summed with the weighted seismic signal itself in order to eliminate filter distortion within a desired band. For this purpose a filter circuit such as illustrated in FIG. 6 has been devised and found to be useful in carrying out the functions hereinabove explained.

The system of FIG. 6 includes an input triode amplifier 60 to the grid of which the seismic signal such as appearing at the output of unit 14, FIG. 1, is applied. The cathode of tube 60 is connected by way of a resistance 61 to ground. A load resistance 62 leads from the anode to a B+ bus 63. The output voltage appearing at the anode of tube 60 is coupled by way of resistor 64 to the grid of a cathode follower tube 65. The grid of cathode follower tube 65 is also connected by way of resistor 66 to a source of negative bias voltage. The signal voltage thus appearing at the cathode of tube 65 is applied to a potentiometer 68, the upper terminal of which is connected to the juncture between cathode resistors 69 and 70. The lower terminal of potentiometer 68 is connected to a common return or ground. The variable tap or arm on potentiometer 68 is connected by way of conductor 72 and resistance 73 to a summing bus 74. Thus the signal applied to the grid of tube 60 will be applied directly to bus 74, provision being made on potentiometer 68 for adjusting the amplitude thereof.

The output signal from the cathode of tube 65 is also applied by way of a resistor 75 to the grid of a cathode follower triode 76. The grid of tube 76 is connected by way of capacitor 77 to ground bus 78. Resistor 75 and capacitor 77 thus connected form an integrator circuit so that the output signal appearing at the cathode of tube 76 is the first integral of the signal from tube 65. The latter signal is applied to a second cathode follower tube 80 by way of a second integrating circuit comprising resistor 81 and capacitor 82, and by way of a circuit including potentiometer 83, and buffer resistor 84 to the summing bus 74. Thus a signal representative of the first integral is applied to the output bus 74, provision being made for adjusting the amplitude thereof on potentiometer 83.

By reason of the integrating circuit 81, 82, the output of tube 80 is representative of the second integral of the signal applied to tube 60. This signal is applied by way of potentiometer 90 and buffer resistor 91 to the summing bus 74.

The signal from tube 80 is also applied by way of integrating network 92 and 93 to cathode follower tube 94 whose output is representative of the third integral of the signal from tube 65. The output of tube 94 is applied by way of potentiometer 95 and buffer resistor 96 to the summing bus 74.

By means of the circuit thus far described the signals applied to the summing bus 74 by way of resistors 73, 84, 91 and 96 represent the seismic signal, the first, second and third integrals, respectively.

Similar to the circuits above described, provision is made in the system of FIG. 6 for applying a first, second and third derivative of the seismic signal to the summing bus 74. More particularly, the seismic signal, the output of tube 65, is applied by way of capacitor 101 to the input grid of tube 102, tube 102 being the first of three stages and is connected in cascade with tubes 103 and 104. Capacitor 101 and resistor 105 form a differentiating circuit to provide the first derivative of the seismic signal. Capacitor 106 and resistor 107 form a second differentiating circuit so that the output of tube 103 is representative of the second derivative. Capacitor 108 and resistor 109 form a third differentiating circuit so that the output of tube 104 is representative of the third derivative of the seismic signal.

The signal representative of the first derivative is applied to the summing bus 74 by way of the circuit including potentiometer 110 and buffer resistor 111. The signal representative of the second derivative is applied to the summing bus 74 by way of the circuit including potentiometer 112 and buffer resistor 113. Similarly, the signal representative of the third derivative is applied to summing bus 74 by way of the circuit including potentiometer 114 and buffer resistor 115.

The signals appearing on the summing bus 74 are then applied to an amplifier system including tubes 120–123, the tubes 121 and 123 comprising cathode follower isolation stages, the output of tube 123 being applied to a first input 124a of a suitable recorder 124. The elements 123a and 123b form an integrator so that the integral of the sum of all signals applied to bus 74 may be recorded as the top trace 140a on record 140.

In this system, provision is also made for applying each of the signals which are summed on the bus 74 to separate input terminals of the recorder 124. More particularly, a buffer unit 125, preferably a cathode follower, interconnects conductor 72 and terminal 127 of recorder 124. Similarly, a buffer unit 128 is connected to terminal 129 to apply to the recorder 124 the first integral function. Buffer units 130 and 131 connected respectively to terminals 132 and 133 apply second and third integral functions to recorder 124. Buffer units 134, 135 and 136 serve to apply the first, second and third derivative functions to terminals 137, 138 and 139, respectively.

The recorder 124 may include a cathode ray display or other visual presentation for monitoring the several signals applied thereto. The amplitudes of the signals as thus applied to the recorder 124 are adjusted by varying the position of the taps on potentiometers 68, 83, 90, 95, 110, 112 and 114 in accordance with the requirements set forth in Table I, II or III depending upon the particular filter to be compensated. Alternatively, the foregoing potentiometers may be adjusted by merely applying an uphole signal to the input triode 60 and adjusting the potentiometers until the signal applied to terminal 124a has the character represented by curve 42 of FIG. 4 or any other preselected curve representative of a desired degree of compensation within a given frequency band.

When the filter has thus been adjusted to an optimum setting, a signal representative of the entire seismogram is applied to the input grid of tube 60 and recorded by recorder 124 on a suitable chart such as chart 140 with the variations thereon providing a substantial representation of the velocity layering in the earth.

In practice it has been found desirable to combine signals from all of the geophones 13, FIG. 1, to form a composite signal for application to the filter of FIG. 6. It may be necessary, of course, in combining the signals to provide correction for weathering and spread geometry, as is well understood by those skilled in the art, so that the composite signal provides a reliable representation of the reflection signal. Such a signal then passed through a seismic filter compensator of the type shown in FIG. 6 will provide an output which is substantially free of distortion within the band covered by the filter of FIG. 6 which may be interpreted in terms of the velocity layering of the earth.

It will be appreciated that the foregoing operations may be applicable to treatment of signals which have been detected as at geophones 13, FIG. 1, amplified in unit 14 and initially recorded upon a recorder 17 in reproducible form.

It will also be understood that within the scope of the present invention it is contemplated that a new field procedure may be undertaken in which the characteristics of the earth, shot and detector portion of the seismic filter are evaluated prior to the recording of any of the seismic signals. In accordance with this aspect of the invention, an initial seismic event is produced as by the detonation of a charge 10, FIG. 1, and the uphole signal is detected by detector 18. The uphole signal is then recorded through an amplifying-filtering system having preferably wide passband characteristics. It is preferred in this instance that the amplifier have a flat frequency amplitude characteristic between the limits of about 10 to 200 cycles. The signal, recorded in reproducible form, is then played back through the amplifying-filtering system 14 but with a filter such as shown in FIG. 6 incorporated therein. The filter of FIG. 6 is then adjusted as upon repeated playback cycles of the uphole signal until a step function of the type shown in FIG. 4 appears at the output. Thereupon a second explosive charge is detonated and the resultant seismic signals from detectors 13 either composite or separately are passed through such a filter and recorded by recorder 15 or recorder 17 for subsequent treatment. By this means there is avoided the inherent limitation on dynamic range imposed by initially recording only those signals of frequencies lying within a relatively narrow band. Compensation is provided for the effect of the filtering action of the shot, the earth and the detector coupling.

The foregoing description has been confined to those cases in which a relatively narrow frequency band has been considered and more particularly the cases wherein the filter characteristics have the general relationships illustrated in FIG. 2. It should be noted that the present invention contemplates compensation of wide passband functions by using only integral functions and derivative functions. In this case Equation 2 would be rewritten in the following form:

$$kG(p) = \frac{kp^{2n}}{(T_1^2p^2 + 2\eta_1 T_1 p + 1)^n (T_2^2 p^2 + 2\eta_2 T_2 p + 1)^n} \quad (8)$$

Equation 3 would also be rewritten to take the following form:

$$\frac{1}{kG(p)} = \frac{(T_1^2 p^2 + 2\eta_1 T_1 p + 1)^n (T_2^2 p^2 + 2\eta_2 T_2 p + 1)^n}{kp^{2n}} \quad (9)$$

Systems having characteristics described by Equations 8 and 9 have broad, flat frequency response between the frequencies $$\frac{1}{2\pi T_1}$$

and $$\frac{1}{2\pi T_2}$$

Outside of this band the desired rejection rate may be achieved by the proper selection of integrators and differentiators as above described. However, experience has indicated that narrow band filter functions are most commonly encountered in seismic exploration where seismic waves are detonated by explosive charges and for this reason the foregoing discussion has been confined substantially to the narrow band problem. However, the present invention is directly applicable to wide passband systems and functions.

In one embodiment of the invention, the system of FIG. 6 incorporated integrators having time constants .02 second and differentiators having time constants of .0004.

While the invention has been described in connection with certain specific embodiments thereof, it will now be understood that further modifications will suggest themselves to those skilled in the art and it is intended to cover such modifications as fall within the scope of the appended claims.

What is claimed is:

1. In seismic exploration where a seismic filter which includes earth travel paths serves to limit frequency components of a seismic signal to a known passband, the combination which comprises means for generating integral functions of said signal in number proportional to the slope of the low frequency side of said passband, means for generating derivative functions of said signal in number proportional to the slope of the high frequency side of said passband, means for generating an output signal representative of the sum of said signal, said integral functions, and said derivative functions, and means for recording said output signal.

2. In seismic exploration where a seismic filter including earth travel paths serves to limit frequency components of a seismic signal within a known passband, the combination which comprises means for generating integral functions of said signal in number proportional to $$\frac{n}{6}$$

where $n$ is the slope of the low frequency side of said passband measured in db/octave, means for generating derivative functions of said signal in number proportional to $$\frac{n}{6}$$

where $n$ is the slope of the high frequency side of said passband measured in db/octave, means for generating an output signal representative of the sum of said signal, said integral functions, and said derivative functions, and means for recording said output signal.

3. In a data processing system having a predetermined passband in which a time variant electrical signal is to be treated, the combination which comprises means for generating a first signal representative of said time variant signal on a predetermined scale, means for generating a first plurality of signals occurring simultaneously and representing derivatives of said first signal on the same scale, said first plurality of signals being dependent in number upon the slope of the high-frequency side of said passband, means for generating a second plurality of signals occurring simultaneously and representing integrals of said first signal on said same scale, said second plurality of signals being dependent in number upon the slope of the low frequency side of said passband, adjustable means for controlling the magnitude of each of said first, said first plurality, and said second plurality of signals, means for combining said first, said first plurality, and said second plurality of signals to produce an output signal, and means for recording said output signal along a time scale corresponding with that of said time variant signal.

References Cited in the file of this patent

UNITED STATES PATENTS

| | | |
|---|---|---|
| 1,315,539 | Carson | Sept. 9, 1919 |
| 2,160,224 | Minton | May 30, 1939 |
| 2,355,826 | Sharpe | Aug. 15, 1944 |
| 2,927,751 | Daspit | Mar. 8, 1960 |

OTHER REFERENCES

"Electronic Analog Computers," Korn and Korn, 2nd edition, McGraw-Hill Book Co., Inc., 1956, New York, N.Y., page 45.

UNITED STATES PATENT OFFICE
CERTIFICATE OF CORRECTION

Patent No. 3,162,756 December 22, 1964

Philip L. Lawrence

It is hereby certified that error appears in the above numbered patent requiring correction and that the said Letters Patent should read as corrected below.

Column 1, line 40, for "untilization" read -- utilization --; column 4, lines 11 and 12, the equation should appear as shown below instead of as in the patent:

$$\frac{1}{kG(p)} = \frac{(T^2 p^2 + 2\eta Tp + 1)^n}{kp^n}$$

Signed and sealed this 18th day of May 1965.

(SEAL)
Attest:

ERNEST W. SWIDER
Attesting Officer

EDWARD J. BRENNER
Commissioner of Patents